United States Patent
Civanlar et al.

(10) Patent No.: US 8,279,260 B2
(45) Date of Patent: *Oct. 2, 2012

(54) SYSTEM AND METHOD FOR A CONFERENCE SERVER ARCHITECTURE FOR LOW DELAY AND DISTRIBUTED CONFERENCING APPLICATIONS

(75) Inventors: Reha Civanlar, Palo Alto, CA (US); Alexandros Eleftheriadis, Tenafly, NJ (US); Ofer Shapiro, Fair Lawn, NJ (US)

(73) Assignee: Vidyo, Inc., Hackensack, NJ (US)

( * ) Notice: Subject to any disclaimer, the term of this patent is extended or adjusted under 35 U.S.C. 154(b) by 210 days.

This patent is subject to a terminal disclaimer.

(21) Appl. No.: 12/539,501

(22) Filed: Aug. 11, 2009

(65) Prior Publication Data

US 2009/0295905 A1    Dec. 3, 2009

Related U.S. Application Data

(63) Continuation of application No. 12/015,945, filed on Jan. 17, 2008, now Pat. No. 7,593,032, which is a continuation of application No. PCT/US2006/028366, filed on Jul. 21, 2006.

(60) Provisional application No. 60/701,108, filed on Jul. 20, 2005, provisional application No. 60/701,109, filed on Jul. 20, 2005, provisional application No. 60/714,741, filed on Sep. 7, 2005, provisional application No. 60/714,600, filed on Sep. 7, 2005, provisional application No. 60/723,347, filed on Oct. 4, 2005, provisional application No. 60/723,348, filed on Oct. 4, 2005, provisional application No. 60/775,100, filed on Feb. 21, 2006.

(51) Int. Cl.
*H04N 7/15* (2006.01)

(52) U.S. Cl. .................. 348/14.09; 348/14.12

(58) Field of Classification Search ............... 348/14.08, 348/14.09, 14.01, 14.12
See application file for complete search history.

(56) References Cited

U.S. PATENT DOCUMENTS

| | | | |
|---|---|---|---|
| 6,167,084 A | 12/2000 | Wang et al. |
| 6,496,217 B1 | 12/2002 | Piotrowski |
| 6,498,865 B1 | 12/2002 | Brailean et al. |
| 7,082,164 B2 | 7/2006 | Chaddha |
| 7,139,015 B2 | 11/2006 | Eshkoli et al. |

(Continued)

FOREIGN PATENT DOCUMENTS

CN           1263421 A        8/2000

(Continued)

OTHER PUBLICATIONS

U.S. Appl. No. 11/615,643, filed Dec. 22, 2006.

(Continued)

*Primary Examiner* — Stella Woo
(74) *Attorney, Agent, or Firm* — Baker Botts L.L.P.

(57) ABSTRACT

Systems and methods for conducting a multi-endpoint video signal conference are provided. Conferencing endpoints are linked by pairs of a reliable and a less reliable communication channel. Conference video signals are scaleable coded in base layer and enhancement layers format. Video signal base layers, which correspond to a minimum picture quality, are communicated over reliable channels. The video signal enhancements layers may be communicated over the less reliable channels. A conference server mediates the switching of video layer information from transmitting endpoints to receiving endpoints without any intermediate coding or re-coding operations. The video conference can be integrated with an audio conference using either scalable coded audio signals or non-scaleable coded audio signals.

56 Claims, 8 Drawing Sheets

U.S. PATENT DOCUMENTS

| | | |
|---|---|---|
| 7,461,126 B2 | 12/2008 | Berkeland et al. |
| 7,477,281 B2 | 1/2009 | Chandra et al. |
| 7,593,032 B2 * | 9/2009 | Civanlar et al. ............ 348/14.09 |
| 2003/0135631 A1 | 7/2003 | Li et al. |
| 2004/0131115 A1 | 7/2004 | Burgess et al. |
| 2004/0236829 A1 | 11/2004 | Xu et al. |
| 2005/0021833 A1 | 1/2005 | Hundscheidt et al. |
| 2005/0024487 A1 | 2/2005 | Chen |
| 2005/0063463 A1 | 3/2005 | Zhang et al. |
| 2005/0132000 A1 | 6/2005 | Richardson et al. |
| 2005/0135477 A1 | 6/2005 | Zhang et al. |
| 2005/0144284 A1 | 6/2005 | Ludwig et al. |
| 2005/0254575 A1 | 11/2005 | Hannuksela et al. |
| 2005/0265450 A1 | 12/2005 | Raveendran et al. |
| 2006/0023748 A1 | 2/2006 | Chandhok et al. |
| 2006/0146934 A1 | 7/2006 | Caglar et al. |
| 2007/0121723 A1 | 5/2007 | Mathew et al. |
| 2009/0219990 A1 * | 9/2009 | Han et al. ................. 375/240.02 |

FOREIGN PATENT DOCUMENTS

| | | |
|---|---|---|
| CN | 1315118 A | 8/2001 |
| GB | 2384932 | 8/2003 |
| JP | 2004260362 A | 9/2004 |
| JP | 2005130428 A | 5/2005 |
| JP | 2005-229400 | 8/2005 |
| WO | WO03/065720 | 8/2003 |
| WO | WO2004/036916 | 4/2004 |
| WO | WO2005/009038 | 1/2005 |

OTHER PUBLICATIONS

U.S. Appl. No. 11/865,478, filed Oct. 1, 2007.

U.S. Appl. No. 12/015,945 (now US 7,593,032) Jan. 17, 2008 (Sep. 22, 2009).

U.S. Appl. No. 12/015,945, Jan. 17, 2008 Preliminary Amendment.

U.S. Appl. No. 12/015,945, Aug. 8, 2008 Non-Final Office Action.

U.S. Appl. No. 12/015,945, Nov. 10, 2008 Response to Non-Final Office Action.

U.S. Appl. No. 12/015,945, Mar. 6, 2009 Final Office Action.

U.S. Appl. No. 12/015,945, Apr. 15, 2009 Response to Final Office Action.

U.S. Appl. No. 12/015,945, May 13, 2009 Notice of Allowance.

(ITU-T H.264) "ITU Recommendation H.264: Advanced video coding for generic audiovisual services" in: International Telecommunication Union (on Line, URL:http://www.itu.int/rec/T-REC-H.264/en) Mar. 2005, entire document.

International Search Report and Written Opinion—PCT/US06/062569 (International Filing Date: Dec. 22, 2006).

International Search Report and Written Opinion—PCT/US06/028366 (International Filing Date: Jul. 21, 2006).

International Search Report and Written Opinion—PCT/US06/080089 (International Filing Date: Oct. 1, 2007).

U.S. Appl. No. 11/615,643, May 19, 2011 Non-Final Office Action.

Hannuksela, M.H., et al., "Coding of parameter sets" Joint Video Team (JVT) of ISO/IEC MPEG & ITU-T VCEG (ISO/IEC JTC1/SC29/WG11 and ITU-TSG16 Q.6) Document No. JVT-C078, May 6, 2002, URL, http://wftp3.itu.int.av-arch/jvt-site/2002_05_Fairfax/JVT-C078.doc.

Supplemental European Search Report for EP06788107.8, dated Jun. 8, 2011.

"Packet-based multimedia communications systems; H.323 (Nov. 2000)"; ITU-T Standard Superseded (S), Intenrational Telecommunication Union, Geneva, CH; No. H.323 (Nov. 2000); Nov. 1, 2000, XP017401474, *paragraphs [3.18], [3.24], [3.33], [3.34], [3.46], [6.4], [9.6], [Annex B]*.

Gharavi et al., "Video coding and distribution over ATM for multipoint teleconferencing", Proceedings of the Global Communications Conference (Globecom), Houston, Nov. 29-Dec. 2, 1993; [Proceedings of the Global Communications Conference (Globecom)], New York, IEEE, US, vol. 2 of 4, pp. 1-7, Nov. 29, 1993, XP000428020.

Honda et al., "Proposal of applications and requirements for scalable video coding" ITU Study Group 16—Video Coding Experts Group—ISO/IEC MPEG & ITU-T VCEG (ISO/IEC JTC1/SC29/WG11 and ITU-T SG16 06); No. M9453, Mar. 3, 2003, XP030038369.

"Scalable video coding applications and requirements", ITU Study Group 16—Video Coding Experts Group—ISO/IEC MPEG & ITU-T VCEG (ISO/IEC JTC1/SC29/WG11 and ITU-T SG16 Q6), No. N6880, Jan. 21, 2005, XP030013600.

U.S. Appl. No. 11/865,478, Feb. 22, 2012 Non-Final Office Action.

U.S. Appl. No. 11/615,643, Jan. 31, 2012 Non-Final Office Action.

* cited by examiner

SYSTEM AND METHOD FOR A CONFERENCE SERVER ARCHITECTURE FOR LOW DELAY AND DISTRIBUTED CONFERENCING APPLICATIONS

CROSS-REFERENCE TO RELATED APPLICATIONS

This application is a continuation of Ser. No. 12/015,945, filed Jan. 17, 2008 now U.S. Pat. No. 7,593,032, which is a continuation of PCT International Application No. PCT/US06/028366 filed Jul. 21, 2006 which claims the benefit of United States provisional patent application Ser. Nos. 60/701,108 and 60/701,109 filed Jul. 20, 2005, 60/714,741 and 60/714,600 filed Sep. 7, 2005, and 60/723,347 and 60/723,348 filed Oct. 4, 2005, and 60/775,100 filed Feb. 21, 2006. Further, this application is related to International application Nos. PCT/US2006/028365 filed Jul. 20, 2006, PCT/US2006/028367 filed Jul. 20, 2006 and PCT/US2006/028368 filed Jul. 20, 2005. All of the aforementioned priority and related applications are hereby incorporated by reference herein in their entireties, and from which priority is claimed.

FIELD OF THE INVENTION

The present invention relates to multimedia technology and telecommunications. In particular, the invention relates to the communication or distribution of audio and video data for multiparty conferencing applications. More specifically, the present invention is directed to implementations of conferencing systems and methods exploiting scalable video and audio coding techniques.

BACKGROUND OF THE INVENTION

Computer networks (e.g., the Internet) have now supplanted traditional distribution systems (e.g., mail or telephone) for the delivery of media and information. Recent advances in multimedia and telecommunications technology have involved the integration of video and audio communication and conferencing capabilities with Internet Protocol ("IP") communication systems such as IP PBX, instant messaging, web conferencing, etc. In order to effectively integrate video communication into such systems, the systems must generally support both point-to-point and multipoint communications. Multipoint servers (also referred to as conference bridges, multipoint conferencing units, or "MCUs") employed in such applications must mix media streams from multiple participants in a multiparty conference and distribute them to all conference participants. Preferably, the MCUs should also provide options including: (1) continuous presence (e.g., so that multiple participants can be seen at same time); (2) view or layout personalization (e.g., so that each participant can choose his or her own view of the other participants—some of the other participants may be viewed in large format and some in small format); (3) error localization (e.g. when error in transmission occurs, the error is resolved between that participant and the server); (4) random entry (e.g. a new participant entrance into the conference has no or minimal impact on other participants); and (5) rate matching (e.g., so that each participant may be connected via a different network connection with different bandwidth and may receive data from the conference bridge at its own rate).

Current MCU solutions, which are referred to as "transcoding" MCUs, achieve these advantageous functions by decoding all video streams in the MCU, creating a personal layout for each participant and re-encoding a participant-specific data stream for transmission to each participant, taking into account, e.g., that participant's available bandwidth, etc. However, this solution adds significant delay to the transmission of the video stream, degrades the quality of the video data, and is costly to develop and deploy (such systems usually require complex, dedicated digital signal processors).

An alternative MCU solution is based on the so-called "switching" MCU. In this solution, only the video and/or audio signals of a single selected participant (i.e., an "active speaker") are transmitted from the MCU to one or all the other participants. The active speaker/participant may be selected by applying quantitative measures of voice activity on the audio signals of all participants. While the selection of the active speaker is typically performed at the MCU, the calculation of voice activity indicator(s) also may be performed on the end-points (prior to transmission). Switching MCUs involve less DSP processing and are less complex than the transcoding MCUs, but they correspondingly have less functionality (e.g., no error localization, no rate matching, limited random entry functionality).

Further, attempts have been made to implement methods specific to one video standard to combine the video streams in the compressed domain. A method based on the ITU-T H.261 standard calls for endpoints to transmit H.261 QCIF images to a conference bridge which then combines 4 of the QCIF images to create one CIF image. Newer video codecs such as ITU-T H.263 and H.264 enable the combination or "compositing" of coded pictures into a bigger picture by considering each of the constituent sub-pictures to be a separate slice of the bigger picture. These and other like methods tend to be very specific to the video compression standards and do not support personal layout (i.e., all participants are forced to watch a given participant in the same resolution), error resilience, or rate matching. They also create new challenges for the MCU designer in terms of proper synchronization between video and audio, and jitter buffer management. Other solutions are based on sending all data streams to all participants; these solutions do not support rate matching or selection of resolution by the endpoints.

Currently available video communication solutions are also not resilient to packet loss and perform unpredictably except in expensive and dedicated network configurations. Network error conditions that may not pose a problem for most other applications can result in unacceptable quality in videoconferencing.

New digital video and audio "scalable" coding techniques directed to general improvements in coding efficiency, also have a number of new structural characteristics. Specifically, an important new characteristic is scalability. In scalable coding, an original or source signal is represented using two or more hierarchically structured bitstreams. The hierarchical structure implies that decoding of a given bitstream depends on the availability of some or all other bitstreams that are lower in hierarchy. Each bitstream, together with the bitstreams it depends on, offer a representation of the original signal at a particular temporal, quality (e.g., in terms of signal-to-noise ratio, or SNR), or spatial resolution (for video).

The term 'scalable' does not refer to magnitude or scale in terms of numbers, but rather to the ability of the encoding technique to offer a set of different bitstreams corresponding to efficient representations of the original or source signal at different resolutions or qualities in general. The forthcoming ITU-T H.264 Annex F specification (referred to as Scalable Video Coding, SVC) is an example of a video coding standard that offers video coding scalability in all of temporal, spatial, and temporal resolutions, and is an extension of the H.264 standard (also known as Advanced Video Coding, or AVC).

Another much older example is ISO MPEG-2 (also published as ITU-T H.262), which also offered all three types of scalability. ITU G.729.1 (also known as G.729EV) is an example of a standard offering scalable audio coding.

Scalability in coding was designed as a solution for video and audio distribution problems in streaming and broadcasting with a view to allow a given system to operate with varying access networks (e.g., clients connected with different bandwidths), network conditions (bandwidth fluctuation), or client devices (e.g., a personal computer that uses a large monitor vs. a handheld device with a much smaller screen).

Consideration is now being given to improved multimedia conferencing applications. In particular, attention is directed toward improving conference server architectures by using scalable video and audio coding techniques. Desirable conference server architectures and data coding techniques will support personal layout, continuous presence, rate matching, error resilience and random entry, as well as low delay.

SUMMARY OF THE INVENTION

The present invention provides a media communication server architecture for multipoint and point-to-point conferencing applications. The media communication server architecture is designed for low-delay communication of scalable video coded (SVC) data and/or scalable audio coded (SAC) data or in general audio coded in such a way that multiple qualities can be derived from the coded bitstream. The server is hereinafter referred to as a Scalable Video Coding Server (SVCS), but it is understood that the same server design and operations also apply to audio. The term Scalable Audio Coding Server (SACS) may also used to alternatively describe the server, particularly in the context of audio applications. The server/client architecture of the present invention may provide conferencing functionalities such as continuous presence, personal layout, and rate matching with low delay and improved error resilience. Advantageously, the server/client architecture of the present invention provides these conferencing capabilities with significantly reduced processing requirements by selectively multiplexing several scalable coded media signals, and by providing multiple layers of resolutions, bit rates, qualities and frame rates.

The present invention further provides a method for optimizing bandwidth utilization in a network link by server-driven synchronization of large packets or frames in statistically multiplexed video streams.

An exemplary embodiment of the present invention provides a method for low delay and bandwidth efficient data communication by multiplexing base layer packets for scalable audio and video streams. The audio coding may be in some cases non-scalable.

In another exemplary embodiment, the present invention provides server-based rate control for scalable video based conferencing, in which the server implements a policy-based or content-based scheme for enhancing the video quality of more important streams.

In yet another exemplary embodiment, the present invention provides a method for cascading a number of client conferencing units based on scalable video coding in a manner that provides low delay and feature-rich services (e.g., continuous presence, rate matching, and personal layout). The method at the same time optimizes network traffic in and between heterogeneous networks.

In still another exemplary embodiment, the present invention provides a method to unify session border control functionality in a videoconference employing a scalable video conferencing server.

BRIEF DESCRIPTION OF THE DRAWINGS

Further features of the invention, its nature, and various advantages will be more apparent from the following detailed description of the preferred embodiments and the accompanying drawing in which.

Figure 1:
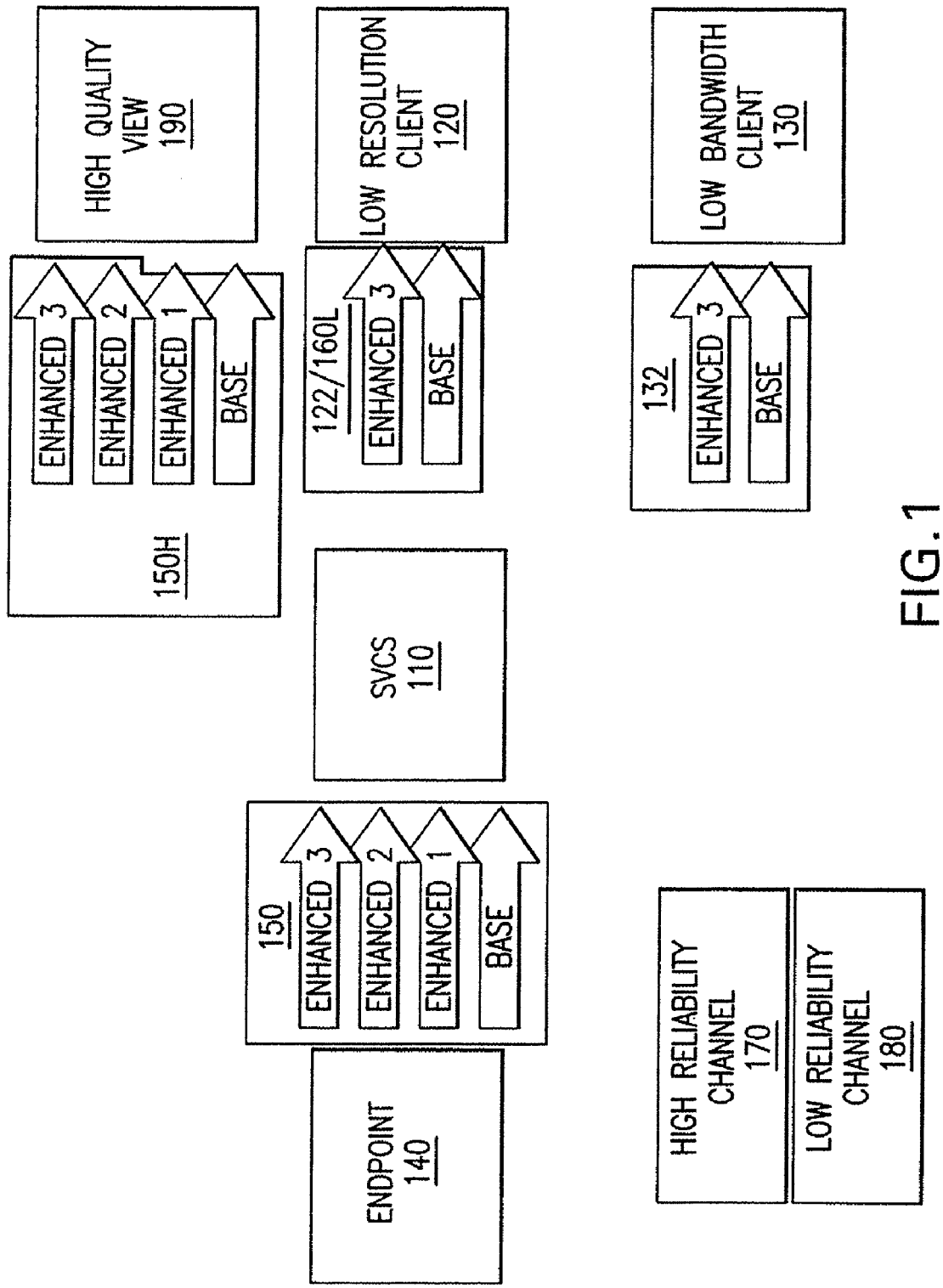
FIG. 1 is a schematic illustration of a multipoint conferencing server (SVCS) system, which is configured to deliver scalable video and/or audio data from an endpoint transmitter to client receivers, in accordance with the principles of the present invention.

Throughout the figures the same reference numerals and characters, unless otherwise stated, are used to denote like features, elements, components or portions of the illustrated embodiments. Moreover, while the present invention will now be described in detail with reference to the figures, it is done so in connection with the illustrative embodiments.

DETAILED DESCRIPTION OF THE INVENTION

The present invention provides systems and methods for multipoint and point-to-point conferencing applications. The systems and methods are designed to deliver video and audio data, which is coded using suitable scalable coding techniques. Such techniques encode the source data into a number of different bitstreams, which in turn provide representations of the original signal in various temporal resolutions, quality resolutions (i.e., in terms of SNR), and in the case of video, spatial resolutions.

For convenience, the inventive systems and methods are described herein primarily in the context of video signals. It will, however, be understood that systems and methods are equally operable with audio signals, or combination of video and audio signals.

FIG. 1 shows an exemplary system 100, which may be implemented in an electronic or computer network environment, for multipoint and point-to-point conferencing applications. System 100 uses one or more networked servers (e.g., a Scalable Video Conferencing Server (SVCS) 110, to coordinate the delivery of customized data to conferencing participants or clients 120, 130 and 140. SVCS 110 may, for example, coordinate the delivery of a video stream 150 generated by endpoint 140 for transmission to other conference participants. In system 100, video stream 150 is first suitably coded or scaled down, using SVC techniques, into a multiplicity of data components (e.g., layers 150a and 150b). The multiple data layers may have differing characteristics or features (e.g., spatial resolutions, frame rates, picture quality, signal-to-noise ratios (SNR), etc.). The differing characteristics or features of the data layers may be suitably selected in consideration, for example, of the varying individual user requirements and infrastructure specifications in the electronic network environment (e.g., CPU capabilities, display size, user preferences, and bandwidths).

An exemplary implementation of system 100 is designed to support multiparty conferencing between participants who may have diverse data requirements or needs. In this implementation, SVCS 110 is suitably configured to select an appropriate amount of information for each particular participant/recipient in the conference from a receiver data stream (e.g., video stream 150), and to forward only the selected/requested amounts of information to the respective participants/recipients. For example, FIG. 1 shows selected amounts of information from video stream 150 (e.g., data streams 122 and 132), which are forwarded by SVCS 110 to clients 120 and 130, respectively. SVCS 110 may be configured to make the suitable selections in response to receiving-endpoint requests (e.g., the picture quality requested by individual conference participants) and upon consideration of network conditions and policies.

This customized data selection and forwarding scheme exploits the internal structure of the SVC video stream, which allows clear division of the video stream into multiple layers having different resolutions, frame rates, and/or bandwidths, etc. FIG. 1 shows an exemplary internal structure of the SVC video stream 150 that represents a medium input of endpoint 140 to the conference. The exemplary internal structure includes a "base" layer 150b, and one or more distinct "enhancement" layers 150a. Layers 150a and 150b collectively represent all of the medium input 150 of endpoint 140 to the conference. Base layer 150b is essential for decoding or recovering the original medium at some basic quality level. Accordingly, SCVC 110 forwards base layer 150b to all receiving-endpoints 120 and 130. Enhancement layers 150a add information and increase the quality of the recovered medium, but these are forwarded to individual receiving-endpoints 120 and 130 only in selected amounts. For example, receiving-endpoint 130, who may be a low bandwidth client, may elect to receive only one of the three enhancement layers 150a shown in FIG. 1.

In system 100, the transmission of an SVC data stream (e.g., video stream 150) to and from the endpoints may be carried out over one or more channels (e.g., channels 170 and 180, which may be either virtual and/or physical channels). Each data-carrying channel may be designated to carry a particular layer of the SVC data stream. For example, a High Reliability Channel (HRC) 170 may carry a basic picture quality data layer (base layer 150b). Similarly, one or more Low Reliability Channels (LRC) 180 may carry "enhancements-to-the-picture" data layers (e.g., better quality, resolution, or frame rate layers 150a). The transmitted SVC data stream may be structured or layered so that information loss on any of the LRCs does not lead to any substantial or intolerable degradation of the received picture quality at the receiving unit (e.g., at SVCS 110 or endpoints 120 and 130). The transmission of the base layer over a reliable HRC assures that the received picture has at least a minimum or basic picture quality. In instances where HRC 170 has unused bandwidth, some or all of the enhancement layers 150a also may be carried over the HRC 170 in addition to base layer 150b. In instances where HRC 170 has sufficient bandwidth to carry all of the layers, then LRC 180 may not be used at all. In such instances only a single communication channel (i.e. HRC 170), but not LRC 180, may be present or implemented in system 100.

In system 100 implementations on best-effort communication networks, which may loose even high priority packets, the integrity of the base layer transmissions may be protected by using suitable enhanced loss resilience and recovery mechanisms (e.g., forward error correction (FEC) and automatic repeat request (ARQ) mechanisms), such as those described in U.S. Pat. No. 5,481,312, entitled "Method Of And Apparatus For The Transmission Of High And Low Priority Segments Of A Video Bitstream Over Packet Networks." The referenced patent is hereby incorporated by reference in its entirety herein. In system 100 implementations on Internet Protocol (IP) networks, which allow differentiated services (DiffServ), the base layer can be transmitted over a high reliability connection provided by DiffServ.

In implementations where no suitable method for establishing a dedicated HRC 170 is available, or if a dedicated transmission channel is of doubtful reliability, system 100 may be configured to implement alternate methods to assure the integrity of base layer transmissions. System 100 may, for example, be configured so that a transmitting unit (e.g., transmitting-endpoint 140 or SVCS 110) proactively repeats transmissions of the base layer information intended for reliable transmission over an HRC. The actual number of repeat transmissions may depend on transmission channel error conditions. Alternatively or additionally, system 100 may be configured so that the transmitting unit caches the base layer information and retransmits the information upon the request of a receiving endpoint or SVCS. This retransmission-upon-request procedure may be effective at least in instances where information loss in the original transmission is detected quickly. The aforementioned system 100 configurations may be useful for reliable delivery of base layer information over individual client-to-SVCS, SVCS-to-client, SVCS-to-SVCS connections, and any combinations thereof, depending on the available transmission channel types and conditions.

In some implementations of system 100, SVCS 110 may be configured to reorganize or redesignate the base and enhancement layer information in a received SVC video stream (e.g., video stream 150) for forwarding to prospective receiving-endpoints. The redesignation of base and enhancement layer information may be customized for each prospective receiving-endpoint or groups of receiving-endpoints. SVCS 110 may then forward the redesignated base and enhancement layers to the prospective receiving-endpoints via suitable HRC and LRC connections, respectively. By the redesignation process, information that was transmitted over an inbound HRC to SVCS 110 may be re-classified and forwarded on an outbound LRC to a particular receiving-endpoint. Conversely, information that was transmitted over an inbound LRC to SVCS 110 may be re-classified and forwarded on an outbound HRC to the particular receiving-endpoint.

Figure 7:
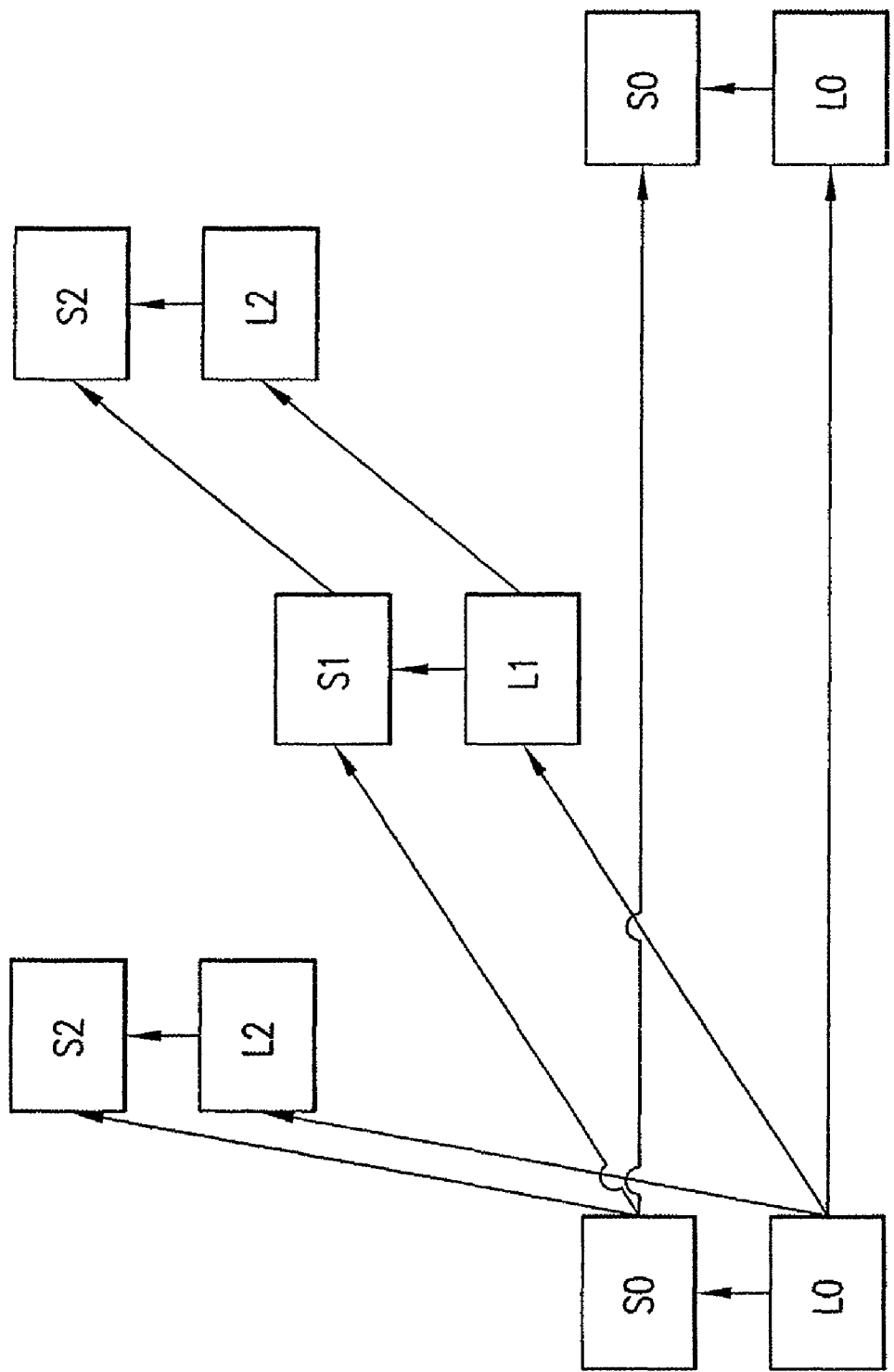
FIG. 7 is a schematic illustration of an exemplary scalable coding multi-layer data format and possible prediction paths for the encoded scaleable layer data used with the exemplary SVCS system, in accordance with the principles of the present invention.

System 100 and its components (e.g., SVCS 100) may be configured to use one or more selectable coding structures or modes in operation. Co-filed U.S. patent application [codec] describes exemplary coding structures that are suitable for videoconferencing applications. With reference to FIG. 7, in an exemplary mode of operation, an SVC data stream (e.g., data stream 150) may be encoded to include layers corresponding to three temporal resolutions (e.g. 7.5, 15, and 30 frames per second) referred to as temporal resolutions 0, 1, and 2, and two spatial resolutions (e.g., QCIF and CIF) referred to as spatial resolutions L and S. In this nomenclature, the base layer is the L0 layer at 7.5 frames per second. S0 corresponds to a representation of the source at CIF resolution and 7.5 frames per second, and S1 corresponds to a representation of the source at CIF resolution and 15 frames per second.

The multi-layer encoding format or structure shown in FIG. 7 is such that the L0 pictures are coded based on (i.e., predicted from) L0 pictures, L1 pictures are coded based on L0 and/or L1 pictures, and L2 pictures are coded based on L0, L1, and/or L2 pictures. A parallel scheme is used for coding the spatial enhancement layers S0 through S2. In this particular scheme, the ability to decode the L1 and L2 layer information depends on the availability of the L0 and L0+L1 layers, respectively. For enhancement from QCIF to CIF, the enhanced resolution pictures (i.e., layers S0, S1, and S2) also may be made available. The ability to decode any of the S0-S2 layers requires that the corresponding underlying L0-L2 layer(s) be available. Further, the ability to decode S1 and S2 layer information depends on the availability of the S0 and S0+S1 layers, respectively.

In an exemplary application of the invention, system 100 may be used to establish a multipoint videoconference. In the conference, a transmitting-endpoint may transmit its input information, which is coded as L0-L2 and S0-S2 layer format, to SVCS 110 for forwarding to receiving-endpoints. The L0, L1, and S0 layers may be transmitted on an HRC and the L2, S1, and S2 layers on an LRC. SVCS 100 may mix and match the layered information to customize the amount of information forwarded to each receiving-endpoint. The receiving-endpoints may receive customized mixed-and-matched layer combinations that have, for example, different bit rates, resolutions, and frame rates. Table 1 shows exemplary mixed-and-matched layer combinations of the L0-L2 and S0-S2 layers, which SVCS 110 may forward to the receiving endpoints via an HRC and an LRC.

TABLE 1

Exemplary Layer Combinations of the L0-L2 and S0-S2 Layers

| Quality of stream provided to a specific endpoint | High Reliability Channel | Low Reliability Channel |
|---|---|---|
| CIF high frame rate | L0, L1, S0 | L2, S1, S2 |
| CIF low frame rate | L0, S0 | L1, S1 |
| QCIF high frame rate | L0 | L1, L2 |
| QCIF low frame rate | L0 | L1 |

A conference participant located at a specific endpoint (e.g., at endpoint 120) may wish to selectively pay more attention to or focus on one particular participant of the many video conferencing participants (e.g., on a participant located at endpoint 140). System 100 allows such a conference participant at endpoint 120 to request a high quality view (e.g., a CIF high frame rate) of the targeted participant/endpoint (e.g., endpoint 140) and a common lower quality view (e.g., a QCIF low frame rate) for the other non-targeted conference participants/endpoints (e.g., endpoint 130). SVCS 110 responds to the request by forwarding customized data streams 150H and 150L for a high quality view and lower quality view from the targeted and non-targeted endpoints, respectively, to the requesting participant/endpoint 120. The requesting endpoint 120 may then decode all the received data streams and display each data stream individually at the requested video quality. FIG. 1 shows, for example, a high quality CIF view display 190 of the targeted participant/endpoint 140, which is presented to the requesting participant at endpoint 120. It will be understood that system 100 may provide multiple levels of additional resolution, temporal, and picture quality for display.

SVCS 100 may further be configured to instruct a targeted transmitting-endpoint to include in its input data stream (e.g., data stream 150) at least a minimum amount of quality and resolution information needed to satisfy all of the current demands by any of the endpoints in the conference.

Figure 2:
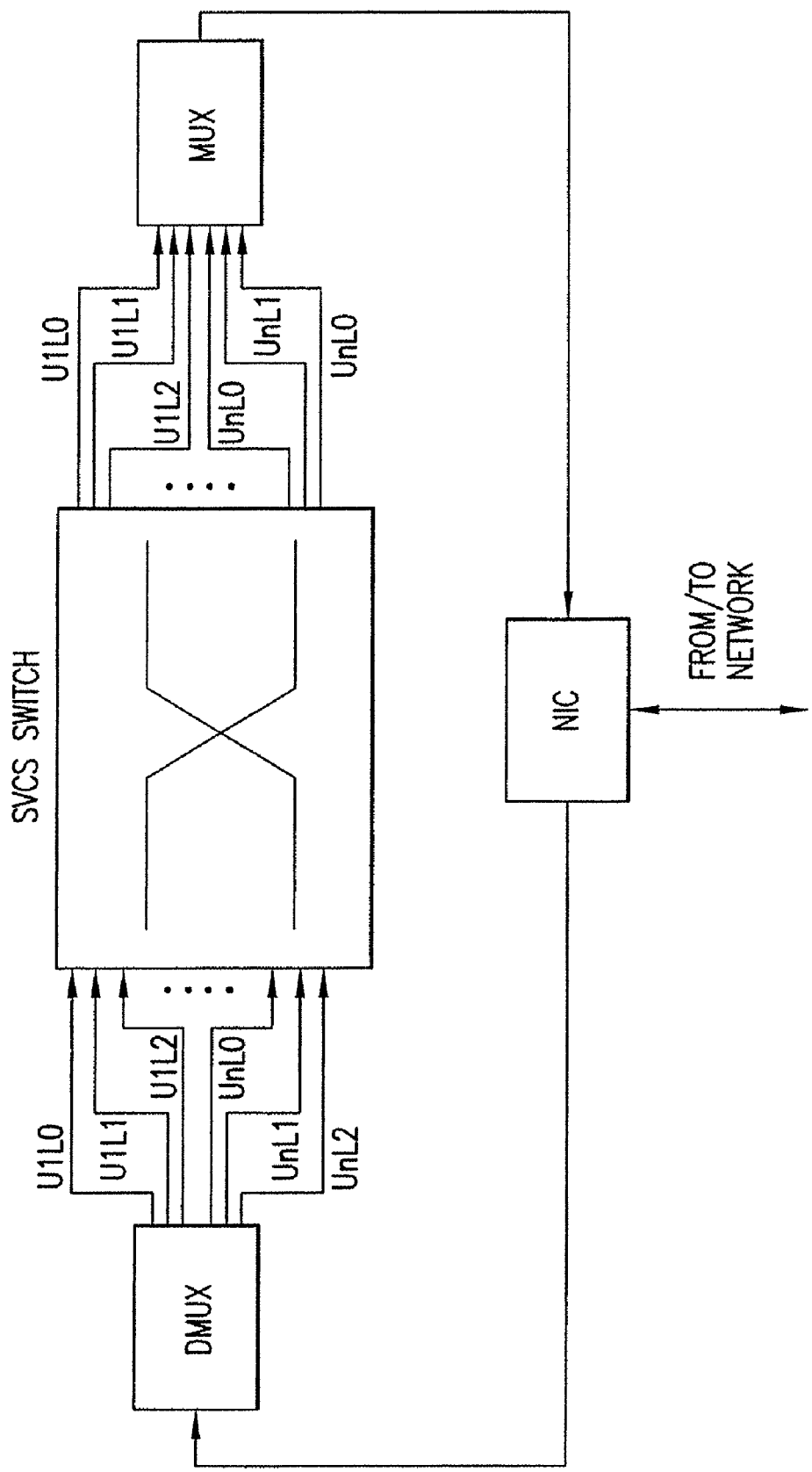
FIG. 2 is a block diagram illustrating the internal switching structure of a multipoint SVCS (or SACS), in accordance with the principles of the present invention.

SVCS 100 acts as a switch to coordinate or route information between endpoints in the multipoint conference. FIG. 2 shows an example of the internal switching structure of SVC 100, which is linked to a communication network by a network interface card (NIC). The internal switching structure of SVC 100 may be designed to demultiplex, multiplex and switch information, which is coded in layers, according to a switching matrix. The internal switching structure may be implemented as any suitable arrangement of software and/or hardware units (e.g., multiplexers and demutiplexers).

It will be noted that in system 100, information is conveyed through SVC preserving the information's initially-coded layer format from a transmitting-endpoint to a receiving-endpoint. No intermediate decoding or re-coding operations at SVC 110 itself are necessary. This feature is in contrast to conventional conferencing arrangements, which deploy a "tandem encoding process" in which intermediate transit or bridging points (e.g., MCUs) decode the encoded data received from a transmitting-endpoint, recode it, and then transmit the recoded data to the receiving-endpoints. The tandem encoding process introduces algorithmic delays in the transmission of information, and further the repeated encoding/decoding involved degrades picture quality.

Advantageously, the conferencing systems of the present invention exploit SVC techniques to avoid or minimize algorithmic delay in forwarding data streams through the SVCS 110 and to deliver enhanced quality video data to endpoints. Additional features of SVC techniques or modes that can be used in the conferencing systems of the present invention are described, for example, in co-filed U.S. patent application Serial No. [SVC], incorporated by reference herein. The referenced patent application describes specific video coding and transmission schemes, which facilitate extraction and switching of video stream information by the SVCS 110.

As previously noted, the inventive conferencing systems and methods advantageously provide high quality, low delay, feature-rich video conferencing functionalities in a manner which is superior and more reliable than is feasible with conventional conferencing arrangements. The advantages of the inventive conferencing systems and methods may be due at least in part to the establishment of a pair of parallel paths or channels (e.g., an HRC and an LRC) to carry different portions of the total information in each SVC data stream between two conferencing system units. Important or critical information necessary for the desired minimum conferencing functionalities is transmitted over the channel, which has superior transmission characteristics (i.e., the HRC, which may be the more reliable channel, the channel with lower jitter, and/or the channel that is more secure). An HRC may be established in the conferencing system implementations in any suitable manner as is practical or appropriate for the implementation environment. Table 2 identifies exemplary practical or appropriate options for establishing an HRC in different electronic network implementation environments.

TABLE 2

Exemplary options for establishing an HRC a) Usage of differential services capability on local or wide area network;
b) Usage of different physical layer capabilities in wireless networks (more important information is keyed in part of the radio signal, which is less prone to errors);
c) Usage of separate network links, one which has guaranteed quality of service and one which has best effort capabilities;
d) Usage of Router configuration based on SVCS IP address, endpoint IP address, port range, or configuration thereof.

It will be understood that only for convenience in illustration and description, a single SVCS 110 is shown in FIG. 1 as deployed in exemplary multipoint conferencing server (SVCS) system 100. Multiple SVCS 110 or like servers may be deployed in system 100 to provide a multipoint videoconferencing session. Multiple SVCS 110 implementations may be advantageous, for example, when a multipoint videoconference spans across heterogeneous (e.g., in cost of bandwidth or quality of service) networks. Multiple SVCS 110 implementations also may be desirable or necessary when conference connection demand (e.g., a large number of participants in a multipoint videoconference session) is likely to exceed the capacity (e.g., physical equipment or bandwidth limitations) of a single SVCS 110. It may be particularly advantageous to deploy several linked SVCS 110 to conduct videoconference sessions in situations, which involve Application Service Provider (ASP)-based conferencing amongst participants from multiple access service providers, or on geographically-extensive corporate networks in which multiple conferencing participants are at diverse corporate locations.

The multiple SVCS 110 may be linked or deployed in a cascade arrangement, which may provide better network utilization and better system scalability over other geometric arrangements. It will be noted that traditional conferencing technologies based on bridges (e.g., hardware MCUs) are not suitable for cascading arrangements for a multiplicity of performance and cost reasons. For example, in a traditional conferencing arrangement, a call that passes through multiple MCUs suffers or accumulates delay in proportion to the number of MCUs traversed. Further, the call information quality degrades in proportion to the number of MCUs traversed because of the tandem encoding process at each MCU. Further still, in the traditional conferencing arrangements, picture/data resolution degrades as the number of cascaded MCUs increases, which deprives participants/endpoints the ability to select a higher resolution picture of at least some of the other participants/endpoints. In contrast, the SVCS of the present invention do not add delay or degrade the picture quality even when the SVCS are cascaded.

Figure 3:
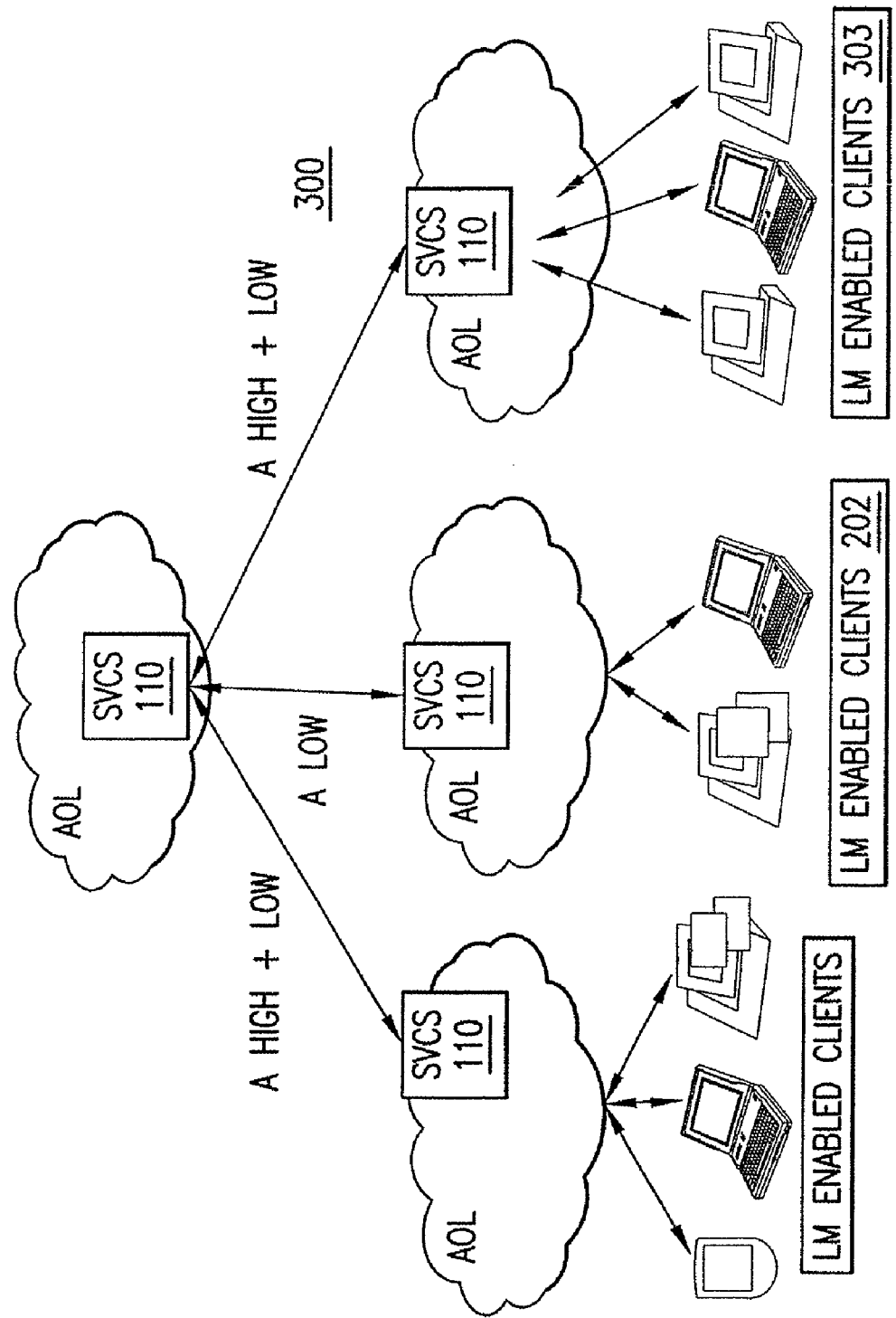
FIG. 3 is a schematic illustration of an SVCS/SACS system configured in a star-cascaded arrangement, in accordance with the principles of the present invention.

FIG. 3 shows an exemplary SVCS system 300 that can host a multipoint videoconference session extending over heterogeneous and geographically diverse communication networks and domains (e.g., AOL, Verizon, Comcast, and France Telecom networks). SVCS system 300 deploys multiple SVCS 110. Individual SVCS 110 may be positioned in different communication networks and/or different domains, and are linked by communications channels (e.g., HRC and LRC) to other SVCS 110. The linked SVCS 110 may be deployed in a star configuration topology (as shown), a full-meshed or redundant configuration topology, a mix of these topologies, or any other suitable linkage topology.

In operation, communications for a single multipoint conference session may be distributed through multiple SVCS 110 that are located in different domains or on different networks. All deployed SVCS 110 may share information about the overall conference structure and topology. Further, all linked SVCS 110 may be configured for efficient addressing or routing of information streams (e.g., to avoid sending duplicate information on expensive wide area networks).

In the multipoint video conference session shown in FIG. 3, all participants/clients 303 in the France Telecom domain may prefer to watch or see "endpoint A" (e.g., participant/client 404) in high resolution. Conversely, all participants/clients 202 in Comcast's domain may prefer to watch or see endpoint A in low resolution. System 300, like system 100, is configured to know and acknowledge the conference participants'/clients' viewing preferences. Accordingly, in response to the viewing preferences of participants/clients 202 and 303, system 300 may instruct endpoint A to stream both—SVC low resolution base layer and high resolution enhanced layer information, to its proximate SVCS 110 (not indicated). The proximate SVCS 110 forwards the base and enhanced layer information to SVCS 110 in the AOL domain, which is central in the star configuration of the SVCS 110 network. In response to the viewing preferences of participants/clients 303, the central SVCS 110 may forward both the high and low resolution information to the France Telecom SVCS 110. Further, in response to the viewing preferences of participants/clients 202, the central SVCS 110 may forward only the low resolution information to the Comcast SVCS 110. In FIG. 3, the type of information transmitted from the central SVCS 110 to the downstream SVCS 110 is indicated by the labels "A high+low" and "A low", respectively.

It will be appreciated that system 300 is suitable for interactive conferencing. In a centralized environment shown in FIG. 3 with a central SVCS 110, which is located in the AOL domain, information transmissions from endpoint A to participants/clients 303 passes through three SVCS 110 (i.e., the proximate, central, and France Telecom SVCS). Accordingly, the signal delay between endpoint A and the recipients 303 of endpoint A's information transmissions is equal to the network delay and three times any individual SVCS unit delay. However, the switching matrix SVCS design of the present invention ensures that individual SVCS unit delays are essentially zero. This will be contrasted with traditional MCU delays, which are typically longer than 200 ms. Use of traditional MCUs instead of the inventive SVCS in system 300 or similar systems would result in an additional 600 ms of delay in signal transmission from endpoint A to participants/clients 303. This amount of delay renders traditional MCU-based systems unusable for interactive conferencing.

The inventive SVCS-based systems may be further configured to respond to network congestion or other environmental factors that may degrade desired conferencing functionalities. For example, system 300 may be configured so that an endpoint or SVCS experiencing network congestion may signal the other SVCS to drop and not forward the enhancement layers sent to them to reduce the impact of network congestion on maintaining or sustaining a conferencing session.

Additionally or alternatively, the inventive SVCS-based systems may be configured to employ scalable coding-based rate control for a multipoint conferencing session. This feature may provide the video bandwidth control that is necessary for maintaining the quality of transmitted video images of moving objects and of abrupt scene changes. Usually, when an imaged object moves suddenly or abruptly in a video scene, the video bandwidth required to maintain the transmitted video quality may increase by 100% or more over the long term average bandwidth requirement. In traditional fixed rate or non-scalable video based systems, gross degradation of video quality caused by moving objects or scene changes is avoided by using "preemptive degradation" transmission schemes that maintain the transmission bit rates to avoid dropping packets. Maintaining the transmission bit rates leads to frames being skipped and decreased SNR, either of which can degrade video quality at least temporarily. However, in most video viewing situations, such temporary or transient quality changes can be visually jarring or disturbing to viewers. At lest for this reason the "preemptive degradation" transmission schemes are not satisfactory solutions for maintaining the quality of transmitted video images of moving objects and of abrupt scene changes. The scalable video-based systems of the present invention are designed to avoid or minimize even the temporary or transient quality changes that are tolerated in traditional fixed rate video systems.

The inventive scalable video-based systems may be configured so that when a video quality degrading motion or scene change is detected, a transmitting endpoint maintains the bit rate on its base layer transmission (e.g., layer 150*b*), but increases the bandwidth on its enhancement layers (150*a*) transmission. The increased information conveyed in the enhancement layers can compensate for the video quality degradation in the fixed rate base layer transmission caused by the motion or scene change in the base layer transmission. In this manner, the total quality of the video stream can be maintained through the motion or scene change at least for the receiving-endpoints that are capable of receiving both the base and enhancement layers. If the network capacity is sufficient to deliver both the base and enhancement layers to receiving-endpoints, then video quality will be maintained. In instances where the network capacity is insufficient to deliver the higher bitrate transmission of the enhancement layers, the level of video quality may be at least the same as would be obtained under the traditional preemptive degradation schemes. The method of compensating for video quality degradation by increasing the transmission of enhanced layer information is also applicable in system implementations where the base bit rate is not kept constant.

Figure 4:
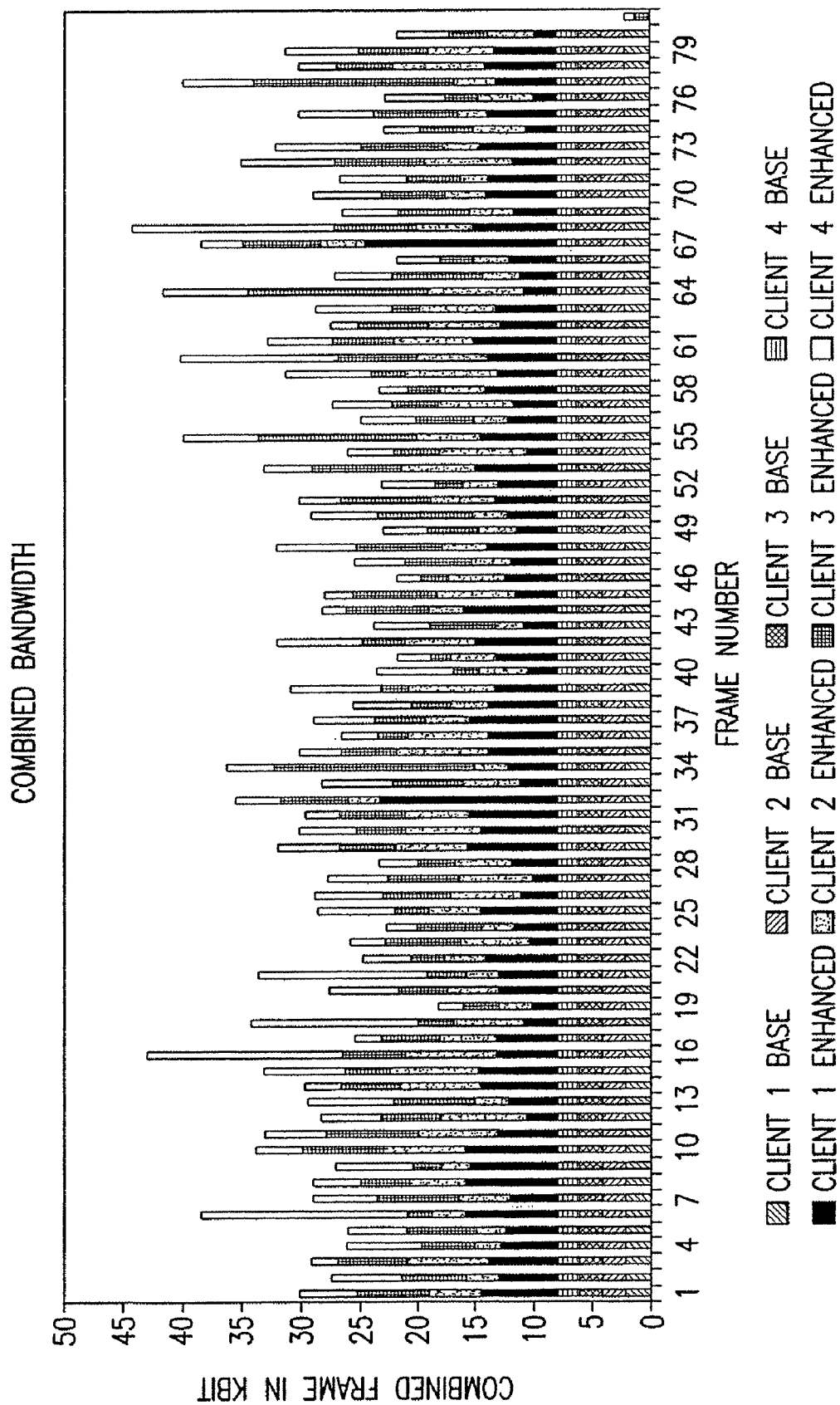
FIG. 4 is a graph illustrating the simulated combined bandwidth provided by four transmitters in an exemplary SVCS system, in accordance with the principles of the present invention.

FIG. 4 shows an example, which demonstrates the advantages of inventive scalable coding-based rate control systems and methods in addressing video quality degradation. In the example, the combined bandwidth from four transmitters linked in a multipoint conferencing arrangement by an SVCS was investigated. For the simulation, each transmitter channel had a base bandwidth of 2 kbit/frame, and an enhancement layer bandwidth of 2-8 kbit/frame, which was increased by another 10 kbit for 7% of the frames. The average total "frame size" is 30 kbit.

FIG. 4 shows that standard deviation of the bandwidth on each transmitter channel is about 50% of the average bandwidth, while the standard deviation of the combined data streams is only about 18% of the average bandwidth. This observed standard deviation ratio of about 3:1 indicates that clipping the transmitted signal information at one standard deviation on each individual transmitter channel results in three times the number of frames clipped, as compared to the number of frames clipped when the transmitted signal information is clipped at one standard deviation on the combined stream by the SVCS. The first situation corresponds to the traditional preemptive degradation schemes, and the latter situation corresponds to the inventive method of compensating for video quality degradation by adjusting the bit rate as described above.

The inventive scalable coding-based rate control systems and methods in addressing video quality degradation may employ any suitable algorithm to mix the data streams and to control the overall bandwidth allocated to a given participant/endpoint. Suitable algorithms that may be employed in an SVCS for bandwidth allocation may be based, for example, on statistical multiplexing, the type of network access for a given participant, synchronization of bitstreams and triage of the participants/endpoints. Features of each of these exemplary algorithms are described in the following paragraphs in the context of multipoint video conferencing applications.

Statistical multiplexing: Video-degrading movement is unlikely to occur simultaneously at all participants/endpoints. In most instances, only one participant/endpoint will transmit video with movement or changing scenes at one particular time. Accordingly, SVCS 110 algorithms may allow only one source at a particular time to contribute more than its long term average share of the bandwidth to transmit its conferencing data stream. As described with reference to FIG. 4 above, the extra bandwidth allocation reduces the number of times the picture quality will be degraded.

Type of network access for a given participant: There may be instances in which a receiving-endpoint may access the conference via a network connection having a bandwidth which is large compared to the video stream bandwidth. In such instances, SVCS 110 may always forward the increased bandwidth compensatory enhancement quality layers to the receiving-endpoint. Further, SVCS 110 may dynamically communicate with the receiving-endpoint to determine the effectiveness of the increased bandwidth allocation. In some instances, the increased bandwidth spikes may either not be received, or may decrease the channel quality for the base layer transmission (such as increased jitter, delay or packet loss). In such instances, SVCS 110 may maintain or raise the average bit rate for the base layer transmission by clipping off the enhancement layer transmissions as needed. SVCS 110 also may re-arrange the quality of service priority for delivery of the remaining layers of information.

Figure 5:
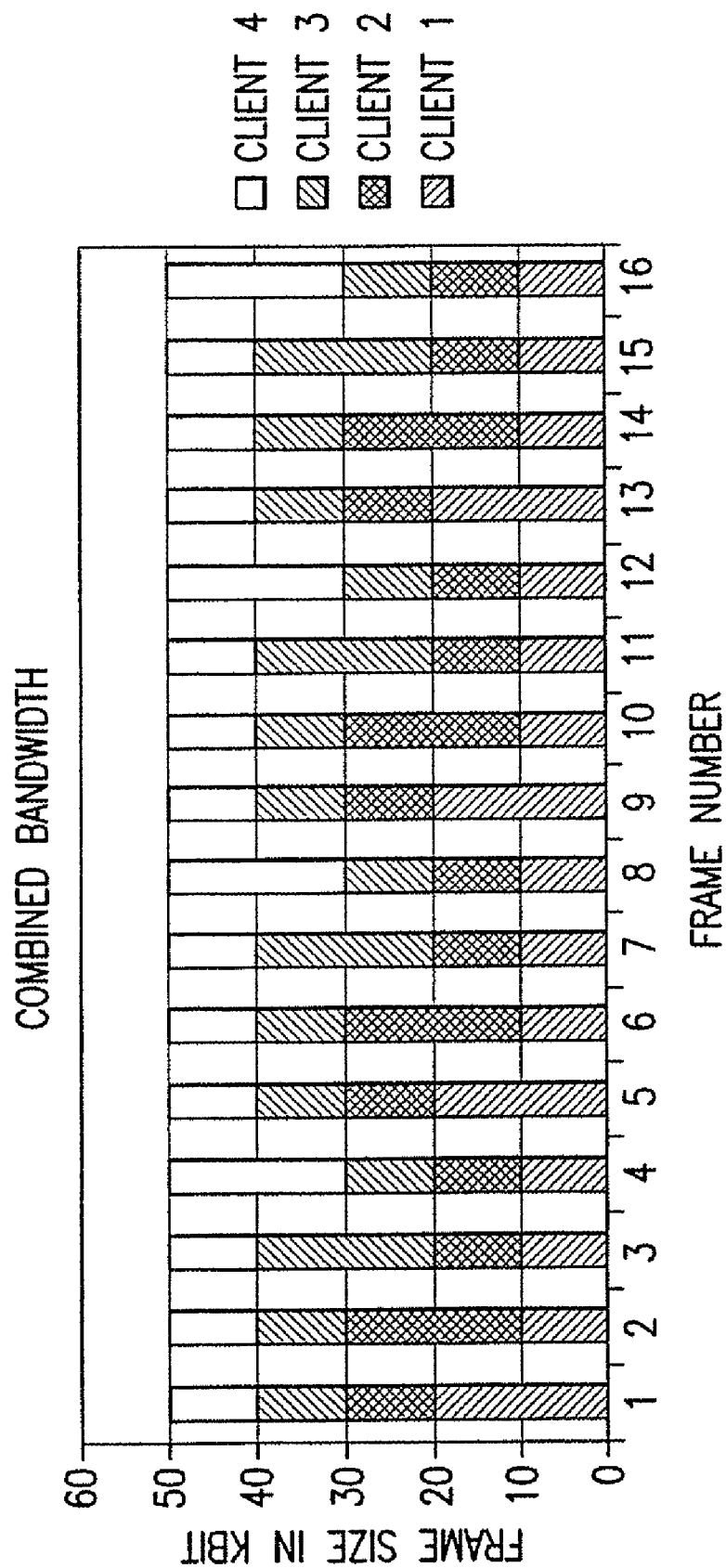
FIG. 5 is a graph illustrating the bandwidth uniformity achieved by staggering large frames in multiplexed video data streams in an exemplary SVCS system, in accordance with the principles of the present invention.

Synchronization of bit streams: In SVC data streams, some coded frames tend to be larger than other frames. For example, L0 pictures are larger than L1 pictures, which are also typically larger than L2 pictures. Bandwidth uniformity may be achieved by staggering the larger frames for different streams. (See, e.g., FIG. 5) Accordingly, SVCS 110 may transmit control signals to some or all of the conferencing endpoints to ensure that the larger frames during a normal temporal threading sequence, or intra frames that may be inserted, are staggered so that the bit rate does not peak over a specific desired value. SVCS 110 may monitor the rate generated by each of the conference participants/endpoints. When bigger packets from a different or new video source arrive at SVCS 110 in a synchronized fashion, SVCS 110 may instruct one or more of the conferencing participants/endpoints to alter their temporal threading sequence to achieve staggering. The participants/endpoints may alter their temporal threading sequence, for example, by changing the sample time on the video source or by shifting the layering sequence.

Triage of the participants/endpoints: In instances where the enhancement layers received from some participants/endpoints must be discarded for rate control, SVCS 110 may seek to prioritize participants/endpoints for discarding information. SVCS 110 may keep the enhancement layers associated with more important participants/endpoints and only discard the enhancement layers associated with other less important participants/endpoints. SVCS 110 may identify the more important participants/endpoints dynamically, for example, by identifying active speaker(s) in the conference. SVCS 110 may identify an active speaker via an audio layer or by receiving such identification from an audio conferencing device or from associated participants/endpoints. Alternatively, SVCS 110 may a priori establish a conference priority policy, which assigns participants/endpoints in a given conference session priority based on suitable criteria such as rank in organization, conferencing moderator function, or other application level information. SVCS 110 may then use the a priori assigned priorities to identify the more important participants/endpoints.

The inventive video conferencing systems and methods may be further configured to integrate audio conferencing features in video conferencing session. Commonly, audio conferencing by itself is simpler to implement than video conferencing for a number of reasons. For example, the bandwidth required by audio is typically only 5-10% of the bandwidth needed for video, which makes it easier to protect audio information from packet loss that it is to protect video information. Additionally, audio signals require less processing power for encoding/decoding than video signals. The processing power required for encoding/decoding audio signals can be lower by about 1-2 orders of magnitude. Further, audio signal delay is more controllable than video signal delay because audio packets can include much shorter time frames than video packets. However, reducing audio signal delay by decreasing the packet size increases the bandwidth overhead associated with correspondingly increasing number of packet headers. Thus, at least in some bandwidth circumstances, the audio signal quality in traditional audio conferencing can be poor.

The inventive SVC-based integrated audio and video conferencing systems and methods address audio signal delay and quality issues effectively by recognizing that the audio and video base layer signals are close in band width and require similar Quality of Service (QoS). Accordingly, transmitting-endpoints in the integrated audio and video conferencing systems are configured to multiplex the payload for audio and the video base layer signals into a single packet for transmission and thereby reducing packet overhead. The combined packet may be de-multiplexed at a receiving-endpoint (e.g., in a point-to-point call) or at an SVCS 110. In some implementations, an external associated audio conferencing bridge (audio MCU) may perform the audio conferencing functions.

In some implementations, the inventive SVC-based integrated audio and video conferencing systems and methods may employ scalable audio coding (SAC) or other audio coding techniques in which multiple qualities can be derived from the coded bitstream. (See FIG. 6). The use of SAC minimizes any need for signal processing in SVCS 110 or the associated audio conferencing bridge. In such implementations, the SAC streams may be switched by SVCS 110 and forwarded to receiving-endpoints without decoding/encoding them in the same or similar manner as it (SVC 110) switches and forwards SVC streams (FIGS. 1-5). SAC is a method, which provides an effective and efficient way to transmit multiple audio qualities. However, when audio and video are transmitted over the same network, the bit rate savings for transmitting scalable audio over transmitting multiple qualities of non-scalable audio may be minor compared to the savings in the case of scalable video. In some circumstances, for example, for compatibility with legacy systems, it may be desirable to continue to use non-scalable audio streams in conjunction with the scalable video streams switched by SVCS 110.

Figure 6:
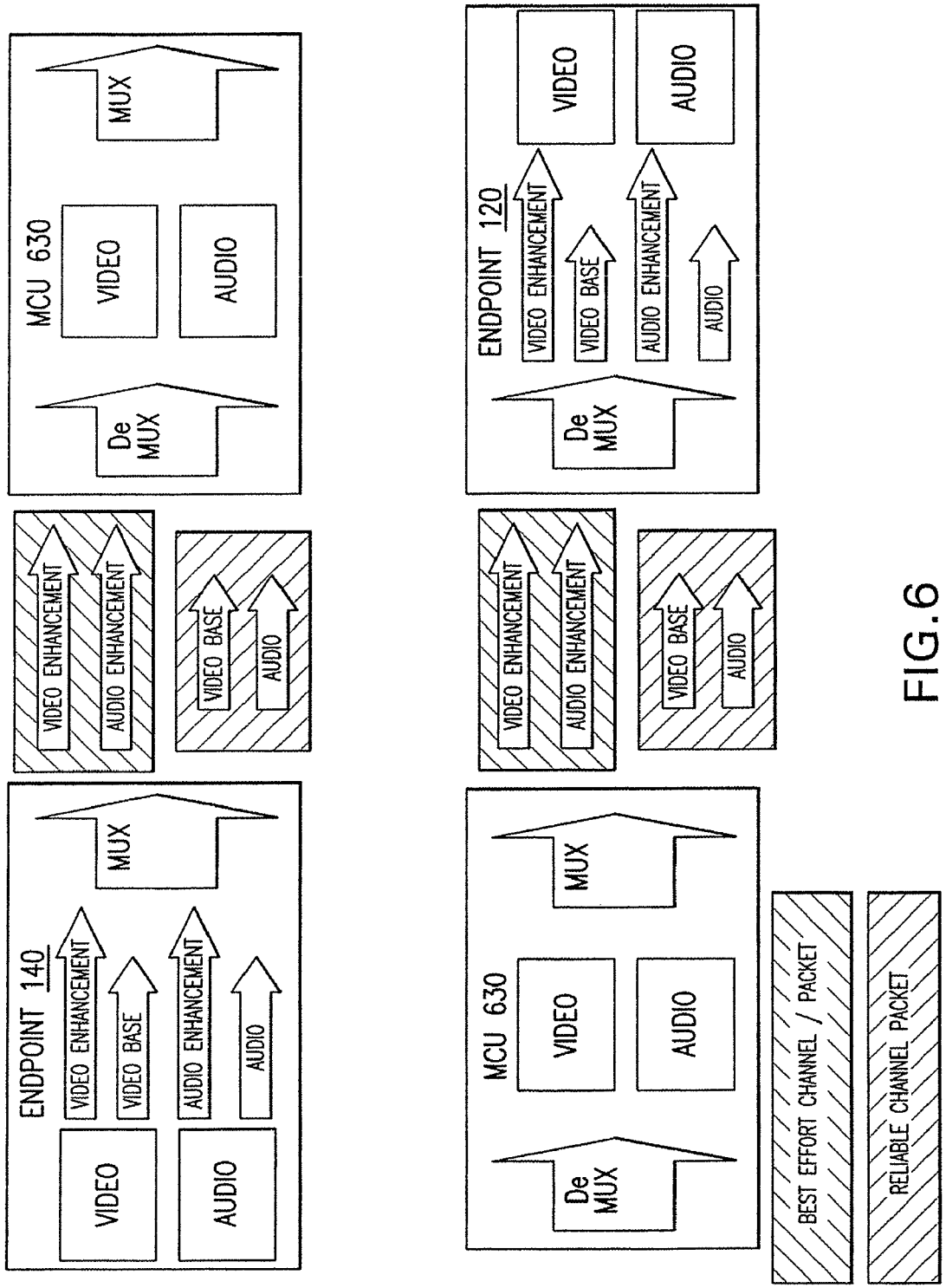
FIG. 6 is a schematic illustration of an arrangement for audio and video packet multiplexing and demultiplexing in an exemplary SVCS system, in accordance with the principles of the present invention.

FIG. 6 shows an exemplary arrangement for multiplexing and de-multiplexing the audio and video streams. Arrangement 600*a* shows a combined audio and video stream 610, which is multiplexed by transmitting-endpoint 140 and transmitted over parallel Best Effort and Reliable Channels. Audio stream 610, if non-scalable coded, is decoded and re-mixed on MCU or associated conferencing server 630 for forwarding to receiving-endpoint 120. Audio stream 610, if scalable coded, may be decoded only by receiving-endpoint 120.

The inventive SVC and SAC-based integrated audio and video conferencing systems may use signal-forwarding schemes to minimize or reduce audio-clipping effects, which can hinder interactive or real-time discussion between conferencing participants/speakers. In an exemplary scheme, each transmitting-endpoint 140 transmits a scalable audio stream (with low and high quality layers) with an indicator of the volume of the speaker represented in that stream. SVCS 110 forwards, to the receiving-endpoints, the strongest streams in high quality and low quality (and bit rate) layers for the next N speakers sorted by the volume indicator. N may typically be 1 to 3. The signal strength indicator may also be computed at the SACS. All of the received streams may be mixed by the endpoints. In this scheme, as the signal from one speaker slowly fades and a new speaker cuts in, a smooth transition that includes the earlier part of the talk spurt may be available to all listeners. Without such a scheme, audio clipping of speakers may occur as they started to talk. By employing scalable audio coding in this manner, the present invention overcomes the shortcomings commonly associated with audio switching.

Figure 8:
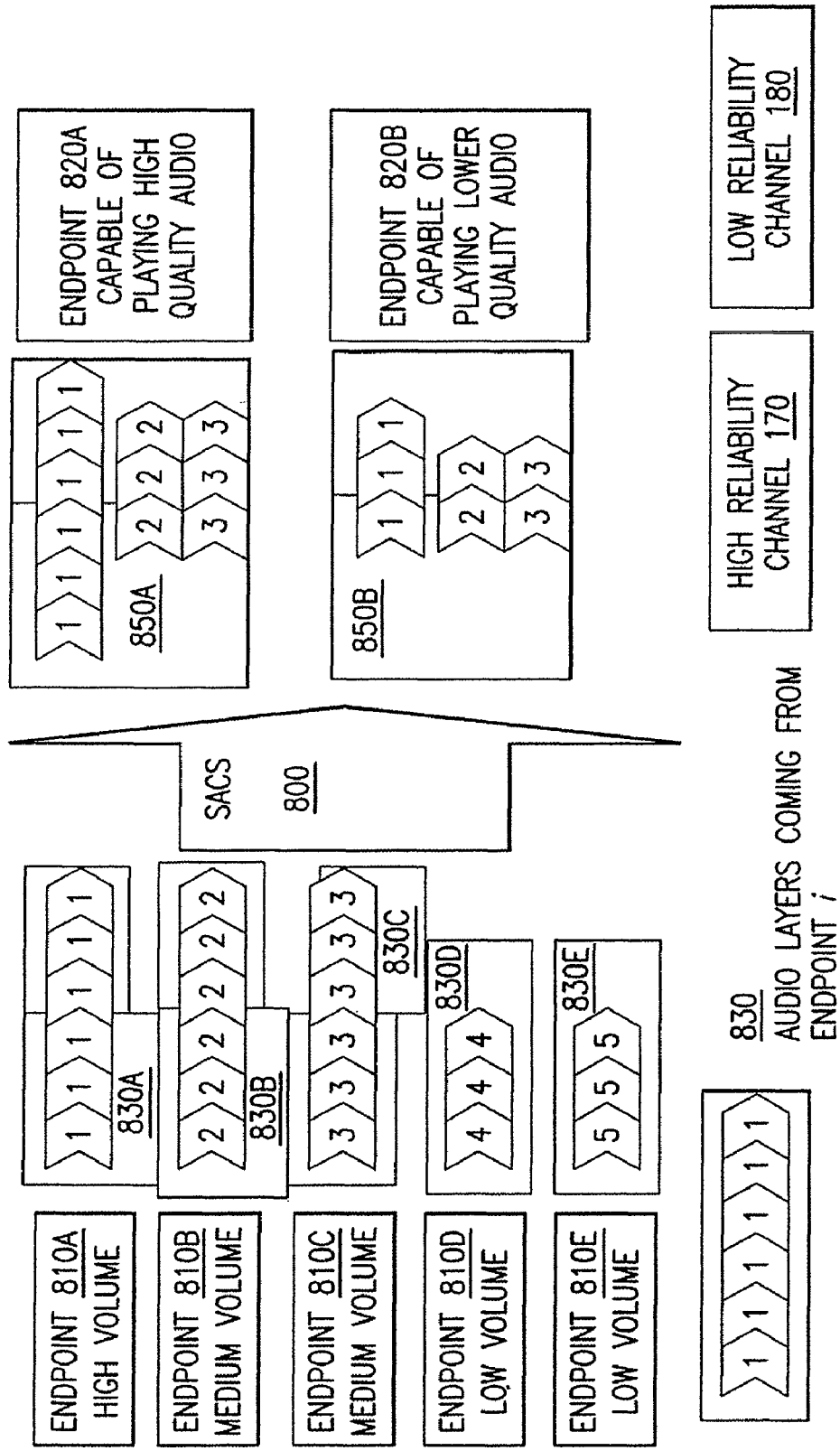
FIG. 8 is a schematic illustration of the operation of an exemplary SACS, where audio stream components from the various senders are selected and sent to the receivers using a high reliability and a low reliability channel, in accordance with the principles of the present invention.

FIG. 8 shows an exemplary arrangement for the operation of an SACS 800 in a conferencing session 801 between multiple endpoints (e.g., endpoints 810A-E). SACS 800 is configured to receive and process audio signals 830, which are coded in multiple qualities. Each endpoint may transmit audio signals 830 having different quality layers or components. The different quality components in audio signal 830 from an endpoint "i" are schematically shown in FIG. 8 with the incremental quality layers ordered from left to right starting with the base layer at the left. SACS 800 chooses an appropriate amount of information in audio signal 830 from each endpoint 810A-E to forward to each of the participating endpoints in conference session 801. The amount and types of information selected (e.g., 850A and 850B) and forwarded to a particular endpoint (e.g., endpoints 820A and 820B, respectively) may depend on the characteristics or needs of the particular receiving endpoint. For example, for endpoint 820A, which is capable of playing a high quality sound and has a network connection that can support such quality, SACS 800 may forward high quality information 850A. Conversely, for endpoint 820B, which is not capable of playing the high quality sound or does not have a network connection that can support such quality, SACS 800 may forward only information 850B, which is of lower quality than 850A.

At particular times or instances in conference 801 as shown in FIG. 8, endpoint 810A may be deemed to be an 'active speaker' so that better audio quality from its transmissions 830A is provided to the listeners. Endpoints 810B and 810C may be deemed to be 'tentative speakers,' whose end users are either (i) currently the real speaker but temporarily overshadowed by interruption and noise originating from endpoint 810A, (ii) who are speaking in lower voice concurrently with endpoint 810A, or (iii) who are previous speakers for whom SACS 800 is gradually stopping to forward the signal components, start from the highest quality and ending with the lowest quality. In all these instances, audio signal components from endpoints 810B and 810C is made available to the listener (e.g., endpoints 820A and 820B) for mixing. This feature allows or enables non-clipped transition between different speaker configurations. Endpoints 810D and 810 E, in the conferencing instance shown in FIG. 8, are deemed to be non-speakers, but are sending low quality information 830D and 830E to SACS 800. SACS 800 may include this information in the audio mix in the event that their volume becomes one of the N stronger audio streams in session 801.

For some audio coding techniques, a receiver/decoder may need more than one packet in order to properly decode the audio stream. Further more, the decoder may need more than one packet in order to fill its play jitter buffer. In such instances, an SAC-based server (e.g., SVCS 110) may be configured to cache one or more audio packets for all incoming streams and to forward the cache to the receiver at an appropriate time (e.g., once such stream is deemed required by the receiver).

In conferencing applications where low delay audio is required, audio data packets that include as little as 10 to 20 milliseconds of samples are commonly used. In such applications, there is a very significant overhead to the audio data (payload) that is introduced by packet headers (e.g., IP, TCP or UDP and RTP information). This overhead can be as high as 200%. For such applications, SAC-based server (e.g., SVCS 110) may be configured to effect rate control for the audio stream by aggregating one or more packets intended for a specific receiver into one combined packet, and then transmitting the one combined packet to the receiver. The transmission of one combined packet reduces header overhead, but at the expense of introducing delay in transmission to the specific receiver. SVCS 110 may be configured to effect rate control by balancing aggregation/cache times and the savings in packet overhead.

This rate-control scheme may be further combined with traditional silence and/or volume detection schemes at the endpoints. In many voice communication systems, an endpoint implements a silence detection scheme in which audio is not transmitted in the network when speech information is deemed not to be present in the captured audio. The silence detection schemes set a threshold level to filter undesired noise from being transmitted over the network. However, this setting of the threshold level for audio transmission often results in clipping of the speaker cut-in talk spurt. In an exemplary SAC-based voice communication system according to the present invention, two thresholds may be implemented: a lower one, after which base layer information is transmitted by SAC-based server (e.g., SVCS 110), and a higher one, after which a higher quality enhancement layer is transmitted. In this manner, clipping of the speaker cut-in talk spurt may be minimized or made less noticeable.

The inventive SVC- and SAC-based conferencing systems and methods as described above utilize the zero-delay, and computationally efficient conferencing functions of SVCS 110. In accordance with the present invention, the functions of the SVCS 110, which are common to multiparty and point-to-point calls, may be advantageously integrated into or exploited in communication network design. For example, integration with session border controllers, proxies and other firewall and Network Address Translation (NAT) traversal mechanisms may be advantageous. All these "media proxy" devices or mechanisms may use a server that routes media traffic through it on the interface points (network edges) between two domains or networks (e.g., for point-to-point calls). In an exemplary network design, SVCS 110 are preferably located at network edge locations. Since every point-to-point call can be expanded to a multiparty call, it may be efficient to use SVCS as a media proxy device as well as to facilitate higher quality call configuration changes (i.e., point to point to multipoint). SVCS 110 deployed at network edges may be used to improve control of video traffic. Co-filed U.S. patent application Ser. No. 11/615,643, incorporated by reference herein, describes video traffic control of schemes involving synchronization of different video streams to achieve better network utilization and management of QoS links.

While there have been described what are believed to be the preferred embodiments of the present invention, those skilled in the art will recognize that other and further changes and modifications may be made thereto without departing from the spirit of the invention, and it is intended to claim all such changes and modifications as fall within the true scope of the invention.

It also will be understood that in accordance with the present invention, the SVCS, the SACS, and conferencing arrangements can be implemented using any suitable combination of hardware and software. The software (i.e., instructions) for implementing and operating the aforementioned the SVCS and conferencing arrangements can be provided on computer-readable media, which can include without limitation, firmware, memory, storage devices, microcontrollers, microprocessors, integrated circuits, ASICS, on-line downloadable media, and other available media.

What is claimed is:

1. A multi-endpoint video signal conferencing system for communicating video signals to at least one receiving endpoint over at least one communication channel, wherein the video signals are scalably coded into layers including a base layer and one or more enhancement layers, the conferencing system comprising:
    a scalable video coding server (SVCS) adapted to be linked to the at least one receiving endpoint by the at least one communication channel,
    wherein the at least one communication channel offers improved quality of service; and
    wherein the SVCS is configured to receive and selectively forward a video signal layer to the at least one receiving endpoint over the at least one communication channel.

2. The conferencing system of claim 1 wherein the SVCS is further configured to provide at least one of continuous presence, personalized layout, rate matching, error localization, and random entry features to the at least one receiving endpoint by selectively multiplexing and forwarding video signal layers thereto.

3. The conferencing system of claim 2 wherein the SVCS is further configured to selectively multiplex and forward video signal layers having two or more signal characteristics to the at least one receiving endpoint, the signal characteristics including different resolution, bit rate, quality, and frame rate characteristics.

4. The conferencing system of claim 1, wherein the SVCS is further configured to process audio signals in addition to processing video signals.

5. The conferencing system of claim 1, wherein the SVCS is further configured to provide at least one of session network border control, media proxy, firewall, and network address translation functions.

6. The conferencing system of claim 1, wherein the improved quality of service of the communication channel comprises the SVCS being further configured to proactively repeat transmission of at least the base layer packets.

7. The conferencing system of claim 1, wherein the improved quality of service of the communication channel comprises the SVCS being further configured to transmit at least the base layer packets with forward error correction.

8. The conferencing system of claim 1, wherein the improved quality of service of the communication channel comprises the SVCS being further configured to cache at least the base layer packets and to retransmit cached packets upon request.

9. A multi-endpoint video signal conferencing system for communicating video signals with at least one transmitting endpoint over at least one communication channel, wherein video signals are scalably coded into layers including a base layer and one or more enhancement layers, the conferencing system comprising:
   a scalable video coding server (SVCS) adapted to be linked to the at least one transmitting endpoint by the at least one communication channel and to receive one or more video signal layers therefrom,
   wherein the at least one communication channel offers improved quality of service; and
   wherein the SVCS is configured to selectively forward the one or more video signal layers received from the transmitting endpoint over the at least one communication channel.

10. The conferencing system of claim 9 wherein the SVCS is further configured to provide at least one of continuous presence, personalized layout, rate matching, error localization, and random entry features for the at least one transmitting endpoint by selectively multiplexing and forwarding video signal layers received therefrom.

11. The conferencing system of claim 9, wherein the SVCS is further configured to process audio signals in addition to processing video signals.

12. The conferencing system of claim 9, wherein the SVCS is further configured to provide at least one of session network border control, media proxy, firewall, and network address translation functions.

13. The conferencing system of claim 9, wherein the improved quality of service of the communication channel comprises the SVCS being further configured to proactively repeat transmission of at least the base layer.

14. The conferencing system of claim 9, wherein the improved quality of service of the communication channel comprises the SVCS being further configured to receive packets with forward error correction.

15. The conferencing system of claim 9, wherein the improved quality of service of the communication channel comprises the SVCS being further configured to receive retransmitted cached packets upon request.

16. A multi-endpoint audio signal conferencing system for communicating audio signals to at least one receiving endpoint over at least one communication channel, wherein the audio signals are coded in components such that multiple qualities can be derived from the bitstream in the coded domain, the conferencing system comprising:
   a scaleable audio coding server (SACS) adapted to be linked to the at least one receiving endpoint in an audio conference by the at least one communication channel,
   wherein the SACS is configured to receive and selectively forward an audio signal component of the audio signals to the at least one receiving endpoint over the at least one communication channel.

17. The conferencing system of claim 16, wherein the audio signal is scalably coded into layered components comprising a base layer and one or more enhancement layers.

18. The conferencing system of claim 16, wherein the at least one communication channel offers improved quality of service.

19. The conferencing system of claim 18, wherein the improved quality of service of the communication channel comprises the SVCS being further configured to proactively repeat transmission of the at least one audio signal component.

20. The conferencing system of claim 18, wherein the improved quality of service of the communication comprises the SVCS being further configured to transmit the at least one audio signal component with forward error correction.

21. The conferencing system of claim 18, wherein the improved quality of service of the communication channel comprises the SVCS being further configured to cache data for the at least one audio signal component and to retransmit cached data upon request.

22. The conferencing system of claim 16, wherein the audio signals are associated with signal strength indicators.

23. The conferencing system of claim 22, wherein the SACS is further configured to:
   forward all quality components of a strongest received audio signal to all participants except an originating participant
   forward less than all quality components of a number of less strong received audio signals, if any, to all participants except an originating participant; and
   forward no quality components of any remaining less strong received audio signals.

24. The conferencing system of claim 16, wherein the audio signals are forwarded to the at least one receiving endpoint by the SACS for mixing.

25. The conferencing system of claim 16, wherein the SACS is further configured to cache received audio components and to forward the cached components to a first receiver when the receiver needs to commence decoding of the audio signal at a specific quality level if such quality level was not previously received.

26. The conferencing system of claim 16, wherein the at least one communication channel comprises a packet-based channel, and wherein the SACS is further configured to aggregate a number of audio packets intended for a receiver into a combined packet, and to forward the combined packet to the receiver.

27. The conferencing system of claim 17, wherein the audio signals are associated with one or more signal strength indicators, and wherein the SACS is further configured to forward only base layer information when one of the one or more signal strength indicators exceeds a first threshold, and to forward base layer and enhancement layer information when one of the one or more signal strength indicators exceeds a second threshold.

28. The conferencing system of claim 16 wherein the SACS is further configured to selectively multiplex and forward audio signal components having two or more signal characteristics to the at least one receiving endpoint, the characteristics including different sampling rate, bit rate, quality, and number of audio signal channels.

29. The conferencing system of claim 16 wherein the SACS is further configured to forward enhancement signal layers to receiving endpoints in priority according to a conferencing system priority policy, which assigns priority to receiving endpoints.

30. The conferencing system of claim 16 wherein the SACS is further configured to process video signals.

31. The conferencing system of claim 16 wherein the SACS is further configured to provide at least one of a session border control, media proxy, firewall, and network address translation functions.

32. The conferencing system of claim 16, wherein the multiple quality components of the coded audio signals comprise independently decodable encodings of said audio signals.

33. The conferencing system of claim 16, wherein the audio signals are associated with one or more signal strength indicators, and wherein the SACS is further configured to forward one quality component when one of the one or more signal strength indicators exceeds a first threshold, and to forward additional quality components when one of the one or more signal strength indicators exceeds a second threshold.

34. The conferencing system of claim 16, wherein the audio signals are associated with one or more signal strength indicators that are computed at the SACS.

35. A multi-endpoint audio signal conferencing system for communicating audio signals with at least one transmitting endpoint over at least one communication channel, wherein the audio signals are coded in components such that multiple qualities can be derived from the bitstream in the coded domain, the conferencing system comprising:
a scaleable audio coding server (SACS) adapted to be linked to at least one transmitting endpoint in an audio conference by the at least one communication channel, wherein the SACS is configured to receive and selectively forward an audio signal component of the audio signals received from the at least one transmitting endpoint overthe at least one communication channel.

36. The conferencing system of claim 35, wherein the audio signal is scalably coded into layered components comprising a base layer and one or more enhancement layers.

37. The conferencing system of claim 35, wherein at the least one communication channel offers improved quality of service.

38. The conferencing system of claim 37, wherein the improved quality of service of the communication channel comprises the SACS being further configured to receive a proactively repeated transmission of at least one audio signal component from the at least one transmitting endpoint.

39. The conferencing system of claim 37, wherein the improved quality of service of the communication channel comprises the SACS being further configured to receive transmit audio signal components with forward error correction.

40. The conferencing system of claim 37, wherein the improved quality of service of the communication comprises the SACS being further configured to receive retransmited cached data upon request.

41. The conferencing system of claim 35, wherein the audio signals are associated with one or more signal strength indicators.

42. The conferencing system of claim 41, wherein the SACS is further configured to:
forward all quality components of a strongest received audio signal to all participants except an originating participant; forward less than all quality components of a number of less strong received audio signals, if any, to all participants except the originating participant; and
forward no quality components of any remaining less strong received audio signals.

43. The conferencing system of claim 35, wherein the at least one communication channel comprises a packet-based channel and wherein the SACS is further configured to aggregate a number of audio packets into one combined packet, and to forward the combined packet.

44. The conferencing system of claim 36, wherein the received audio signals are associated with one or more signal strength indicators, and wherein the SACS is further configured to forward only base layer information when one of the one or more signal strength indicators exceeds a first threshold, and to forward base layer and enhancement layer information when one of the one or more signal strength indicators exceeds a second threshold.

45. The conferencing system of claim 36, wherein the audio signals are associated with one or more signal strength indicators, and wherein the one or more transmitting endpoints are configured to transmit only base layer information when one of the one or more signal strength indicators exceeds a first threshold, and to transmit base layer and enhancement layer information only when one of the one or more signal strength indicators exceeds a second threshold.

46. The conferencing system of claim 35 wherein the SACS is configured to selectively multiplex and forward audio signal components having two or more signal characteristics, the characteristics including at least one of different sampling rate, bit rate, quality, and number of audio signal channels.

47. The conferencing system of claim 35 wherein the SACS is further configured to process video signal in addition to processing audio signals.

48. The conferencing system of claim 35 wherein the SACS is further configured to provide at least one of a session border control, media proxy, firewall, and network address translation functions.

49. The conferencing system of claim 35, wherein the multiple quality components of the coded audio signals each comprise independently decodable encodings of the said audio signals.

50. The conferencing system of claim 35, wherein the audio signals received from transmitting endpoints are associated with signal strength indicators, and wherein the SACS is further configured to forward only base layer information when one of the one or more signal strength indicators exceeds a first threshold, and to forward base layer and enhancement layer information when one of the one or more signal strength indicators exceeds a second threshold.

51. The conferencing system of claim 35, wherein the audio signals are associated with signal one or more strength indicators, and wherein the at least one transmitting endpoint is configured to transmit only base layer information when one of the one or more signal strength indicators exceeds a first threshold, and to transmit base layer and enhancement layer information only when one of the one or more signal strength indicators exceeds a second threshold.

52. The conferencing system of claim 35, wherein the audio signals received from the at least one transmitting endpoint is associated with one or more signal strength indicators that are computed at the SACS.

53. The conferencing system of claim 35, wherein the audio signals received from the at least one transmitting endpoint is are associated with signal strength indicators that are computed at the transmitting endpoints.

54. An apparatus for multi-endpoint video signal conferencing over an electronic communications network, the network having communication channels linking the conferencing endpoints with at least one communication channel linking an endpoint having a superior quality of service compared to other channels, said apparatus comprising:
- one or more computer-readable storage media; and
  - software embodied in the one or more computer-readable storage media that is operable when executed to:
  - obtain a scalable video coded video signal, wherein the video signal is coded in a layered format including a base layer and one or more enhancement layers
  - select at least one layer of the coded video signal; and
  - forward information in the selected layer to the endpoint over the communication channel having superior quality of service.

55. An apparatus for multi-endpoint audio signal conferencing over an electronic communications network, the network having communication channels linking the conferencing endpoints (i.e., the transmitting and receiving endpoints), the apparatus comprising:
- one or more computer-readable storage media; and
  - software embodied in the one or more computer-readable storage media that is operable when executed to:
  - obtain audio signals that are coded in component bitstreams such that multiple qualities can be derived from a bitstream in the coded domain; and
  - selectively forward audio signal components received from transmitting endpoints over their respective linking communication channels to receiving endpoints over their respective linking communication channels.

56. A apparatus for multi-endpoint video signal conferencing over an electronic communications network, the network having communication channels linking the conferencing endpoints, the apparatus comprising:
- one or more computer-readable storage media; and
  - software embodied in the one or more computer-readable storage media that is operable when executed to:
  - obtain a scalable video coded video signal, wherein the video signal is coded in a layered format including at least a base layer and one or more enhancement layers;
  - select at least one layer of the coded video signal; and
  - selectively multiplex and forward video signal layers to the conferencing endpoints over the linking communication channels, thereby providing at least one of continuous presence, personalized layout, rate matching, error localization, and random entry features to the conferencing endpoints.

* * * * *